Aug. 10, 1926.  
C. L. THORNBERRY  
1,595,263  
WASTE PAPER CONTAINER  
Filed Feb. 24, 1925    2 Sheets-Sheet 1

C. L. THORNBERRY, INVENTOR.

BY Emil F. Lange
ATTORNEY.

Aug. 10, 1926.
C. L. THORNBERRY
1,595,263
WASTE PAPER CONTAINER
Filed Feb. 24, 1925
2 Sheets-Sheet 2
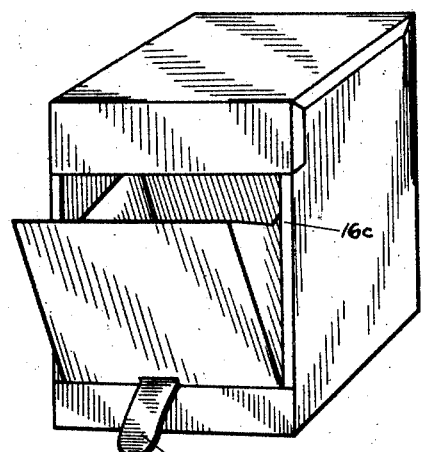
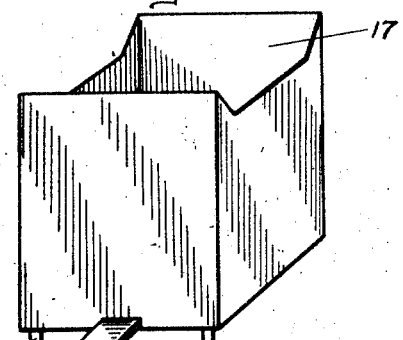
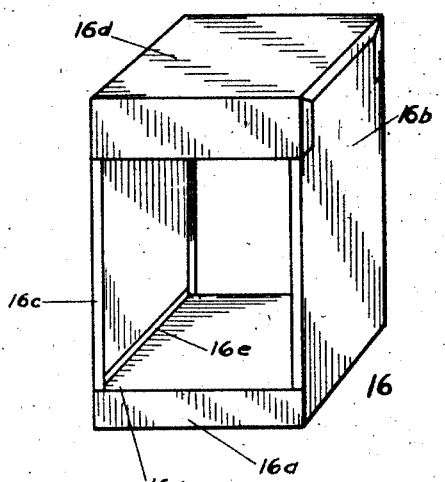
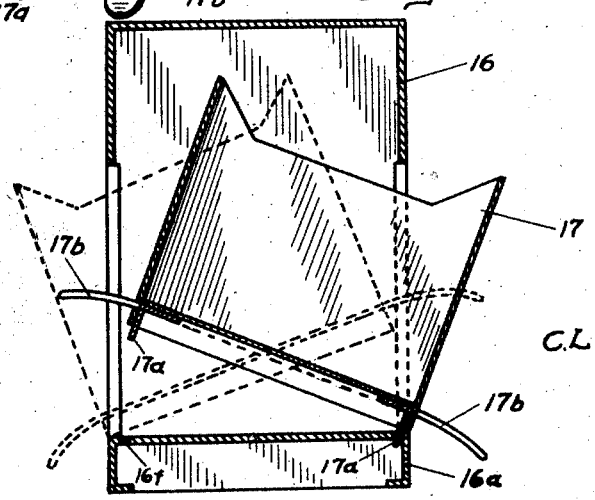
C. L. THORNBERRY. INVENTOR.
BY *Emil T Lange*
ATTORNEY Patented Aug. 10, 1926.

1,595,263

UNITED STATES PATENT OFFICE.

CHARLES L. THORNBERRY, OF LINCOLN, NEBRASKA.

WASTE-PAPER CONTAINER.

Application filed February 24, 1925. Serial No. 11,351.

My invention relates to improvements in containers for waste paper and similar waste material, the improvements taking the form of a radical departure from the usual types of waste baskets in order to provide a container which is neat and ornamental in appearance, which occupies a relatively small amount of space, which is sanitary, and which above all, is fireproof.

Waste paper baskets are unsightly in appearance even when made of ornamental material and in attractive colors. The accumulated mass of waste paper and other trash alone is sufficient to make them unattractive, but when they are made to serve as cuspidors they become positively repulsive and dangerous to health as well. Then too, disastrous conflagrations are often started by carelessly throwing matches and cigarettes into waste baskets. The primary object of my invention is the provision of a waste paper receptacle which will be free from these defects. Other objects will be pointed out in the following description.

Referring now to my drawings,

Figure 5 is a view in perspective of a modified form of my invention.

Figure 6 is a perspective view of the container portion of the waste paper receptacle shown in Figure 5.

Figure 7 is a view in perspective of the case or support for the container shown in Figure 6.

Figure 8 is a vertical transverse sectional view of the form of my invention shown in Figure 5.

Figure 1:
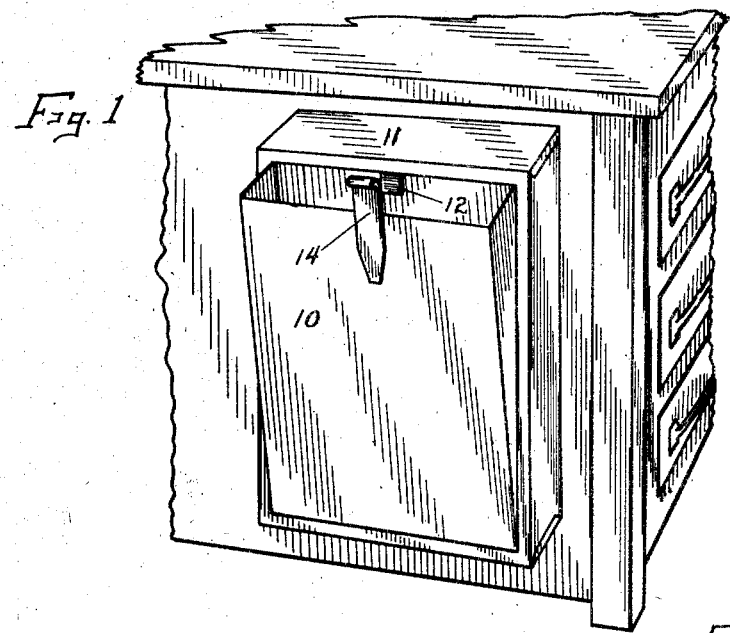
Figure 1 is a view in perspective of the corner of a desk having my waste paper receptacle attached thereto.
Figure 2:
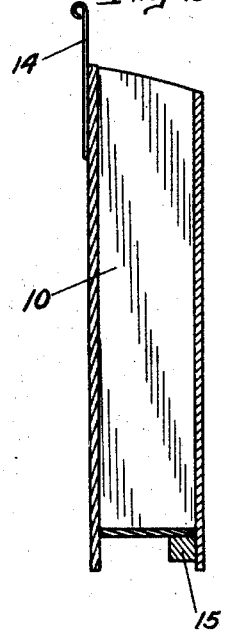
Figure 2 is a vertical transverse sectional view of the container portion of my device.
Figure 4:
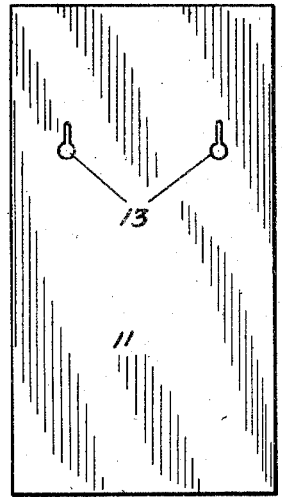
Figure 4 is a rear elevation of the support for the container, showing particularly the means for attaching it at the side of a desk.
Figure 3:
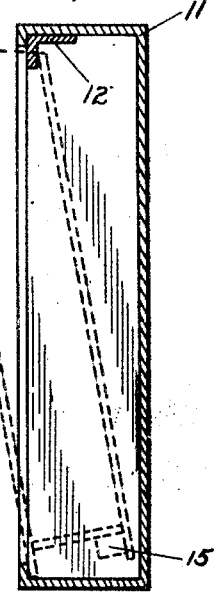
Figure 3 is a vertical transverse sectional view of the entire waste paper receptacle.

The waste paper receptacle in the form shown in Figures 1, 2, 3, and 4 is designed to be attached at the side of a desk. It consists of the receptacle 10 and a case or support 11. Both are made from sheet steel or similar material, and they may be painted or enameled in any suitable color to match the office furniture. The case or support 11 is oblong in form and has its side open. Around the opening all of the edges are inturned so as to leave no rough exposed edges. At the upper edge of the opening is a stop 12 whose function will be fully explained in the following description. The stop 12 is preferably secured by welding to the upper wall of the case 11 as shown in Figure 3. The case 11 is also provided with suitable means for detachably securing it to a desk, these being preferably in the form of eyes 13 for engaging the heads of screws which are driven into the side of the desk.

The container 10 is open at its top. The bottom is spaced somewhat above the lower edges of the sides, as shown in Figure 2. The upper edges of the lateral sides slope downwardly toward the rear. It is further provided with a suitable handle 14 secured to the front wall and projecting above the top of the case 11.

When it is desired to install my invention on the end wall of the desk, the container 10 is first removed from the case 11 so as to give access to the eyes 13, the screws being then driven into the wall of the desk, the device as a whole being positioned at such a height that the handle 14 will project slightly above the level of the desk top. The container 10 is then inserted into the case 11 by first tilting it slightly to place the upper edge of its rear wall behind the stop 12, and then raising the container 10 a sufficient distance to position the lower flange of the front wall of the container behind the upwardly projecting lower flange at the opening in the case 11.

When it is desired to deposit waste paper or other waste material in the receptacle, the waste paper is simply carried by the hand to the edge of the desk. The hand in the movement engages the handle 14 and tilts the container 10 into the position shown in dotted lines in Figure 3. The paper is then released and it falls into the container 10. For restoring the container 10 to its normal or closed position, there is provided a weight 15 which is secured underneath the bottom of the container against the depending flange of the rear wall. This weight carries the container back to its closing position immediately after the handle 14 is released. The opening movement of the container 10 is limited by the stop 12 which engages the rear wall of the container at full opening, the stop preventing the container from accidentally falling out of the case during the opening movement. When however it is desired to empty the container of its contents, it is only necessary to lift the container to disengage the bottom front flanges of the container and the case and to then lower the container sufficiently for the upper edge of its rear wall to clear the stop 12. The operation of inserting the container in the case or removing it therefrom is exceedingly simple, but it is impossible for the container to be accidentally disengaged from the case to spill the contents on the floor. When the handle 14 is released after the waste paper has been deposited in the container, the weight 15 suddenly restores the container to its normal or closing position, this movement being resisted by the cushion of the air within the container and the case. Both the opening and the closing movements are thus silent. While the form just described is designed primarily for use on the end wall of a desk, it is of course obvious that it may be attached to other articles of furniture also or to the wall of a room or it may be placed on the floor.

The form shown in Figures 5, 6, 7, and 8 is designed to be placed on the floor, being particularly useful in the operating rooms of surgeons and dentists and in hospitals. It consists of the case 16 and the container 17. The case 16 is made by properly forming and uniting four separate pieces of sheet metal. The base 16$^a$ is made in the form shown in Figure 8 with folds at only the front and rear sides. The rectangular side pieces 16$^b$ are welded to the base so that their bottom edges will be on a level with the bottom of the base 16$^a$. Portions of the side pieces 16$^b$ are bent and turned inwardly to give a panel effect at 16$^c$. The top piece 16$^d$ is downturned at the front and rear with the edge portions inturned at the front and rear openings of the case. The top piece 16$^d$ is lapped over the side pieces 16$^b$ at 16$^c$, the lapped portions being welded to the side pieces. In order to give added rigidity to the case, L-shaped reinforcing members 16$^e$ are welded to the sides and base in the lower interior edges of the case. The case is further provided with two pairs of slots or apertures 16$^f$ for engaging suitable projections on the receptacle 17.

The receptacle or container 17 is formed as shown in Figure 6. It is box-like and its front and rear walls have the same size and dimensions as the openings in the case 16. The two lateral sides are cut away at their upper portions as shown in Figure 6. At each of its corners is a depending projection 17$^a$, these projections being adapted to seat into the apertures 16$^f$ of the case. Underneath the container and secured to the bottom thereof is a strap having two projecting tongues 17$^b$ which are preferably slightly rounded and downturned.

When in use the waste paper receptacle rests on the floor and may be moved about into any convenient position. All four projections 17$^a$ are seated in their respective apertures 16$^f$ and prevent displacement of the container in the case when the device is being moved from one position to another. When it is desired to deposit paper or other waste material in the container it is only necessary to tread on one or the other of the tongues 17$^b$ to swing the container into the full line position or the dotted line position shown in Figure 8, the pivotal movement being about the tongue and slot connection on the side of the operator. When the paper has been dropped the foot is released from the tongue 17$^b$ whereupon the container will fall back into its closing position. The fact that the container is accessible from both sides adds materially to its convenience, especially when used on the floor of operating rooms. It is also useful in large office rooms where it may serve two or more desks. It is neat and ornamental in appearance and will add to the attractiveness of any room in the home.

Both forms of the receptacle are sanitary. They are made of sheet steel and enamelled so that they may easily be cleaned if it becomes necessary. They are fireproof, and should a burning match or a cigarette be dropped into the receptacle, the fire will be confined to the receptacle where combustion is necessarily slow because of lack of air. The use of my receptacle eliminates entirely the fire hazard of the wicker waste basket which has been the source of many disastrous conflagrations. Their construction is such that they are convenient in use. There are no lids which must be removed before dropping waste into them, and their contents may be removed as easily as those of the ordinary types of waste baskets.

Having thus described my invention in terms which will be readily understood by others skilled in the art to which it pertains, what I believe to be new and desire to secure by Letters Patent of the United States is:—

A waste paper container comprising a receptacle and a casing therefor, said casing being provided with slotted apertures for removably securing it to the end wall of a desk, said receptacle having a detachable pivot connection at the lower and outer edge of said casing, a finger secured to the outer wall of said receptacle, said finger being adapted to extend above the upper surface of said casing and substantially to the level of the desk top, and means for limiting the outward movement of said receptacle, the arrangement being such that the occupant of the desk may open said waste paper container and deposit the waste paper with one sweep of the hand.

In witness whereof I affix my signature.

CHARLES L. THORNBERRY.